United States Patent Office 3,435,746
Patented Apr. 1, 1969

3,435,746
PHOTOGRAPHIC SHUTTER
Wilhelm Pross, Munich, Germany, assignor to Compur
Werk Gesellschaft mit beschränkter Haftung & Co.,
Munich, Germany, a firm of Germany
Filed Jan. 23, 1967, Ser. No. 610,923
Claims priority, application Germany, Feb. 1, 1966,
C 38,087
Int. Cl. G03b 9/00
U.S. Cl. 95—53    8 Claims

ABSTRACT OF THE DISCLOSURE

There is disclosed a shutter with a rotatable master member which during its running down movement, when the opening of the aperture reaches a maximum, encounters and is stopped for a predetermined time by a delay mechanism, and then is released to complete its running down movement and cause the opening of the aperture to be closed. The delay mechanism comprises a structure for directly receiving and absorbing the impact between the master member and the delay mechanism to minimize thereby rebounding of the master member. The structure comprises an impact receiving element displaceable in the direction of impact from a rest position, and an impact absorbing elastic element for resisting displacement of said impact receiving element.

Background of the invention

In photographic shutters of the kind comprising a movable master member for turning a blade drive ring to open and close the camera aperture, it is common practice to employ a delay mechanism which stops movement of the master member when the aperture is open to a usually pre-set maximum extent, and, after a predetermined exposure time, release the master member so that it can complete its running down movement and thereby cause the camera aperture to be closed. In moving from its cocked position to that position where at it is engaged by the delay mechanism, the master member acquires substantial momentum. Consequently, when the running down motion of the master member is abruptly stopped by the delay mechanism, there is a tendency for the master member to rebound and thereby vary the area of the aperture opening.

An object of this invention is to provide a camera shutter delay mechanism with structure that minimizes rebound of the master member when abruptly stopped by the delay mechanism.

Another object of this invention is to provide a generally improved and more satisfactory delay mechanism.

Still, another object of this invention is to provide a camera shutter delay mechanism with a master member rebound minimizing structure which is rugged, compact and generally applicable.

Brief description of the drawings

These and other desirable objects may be attained in the manner disclosed as an illustrative embodiment of the invention in the following description and in the accompanying drawings forming a part hereof, in which.

Detailed description of a preferred embodiment

Figure 1:
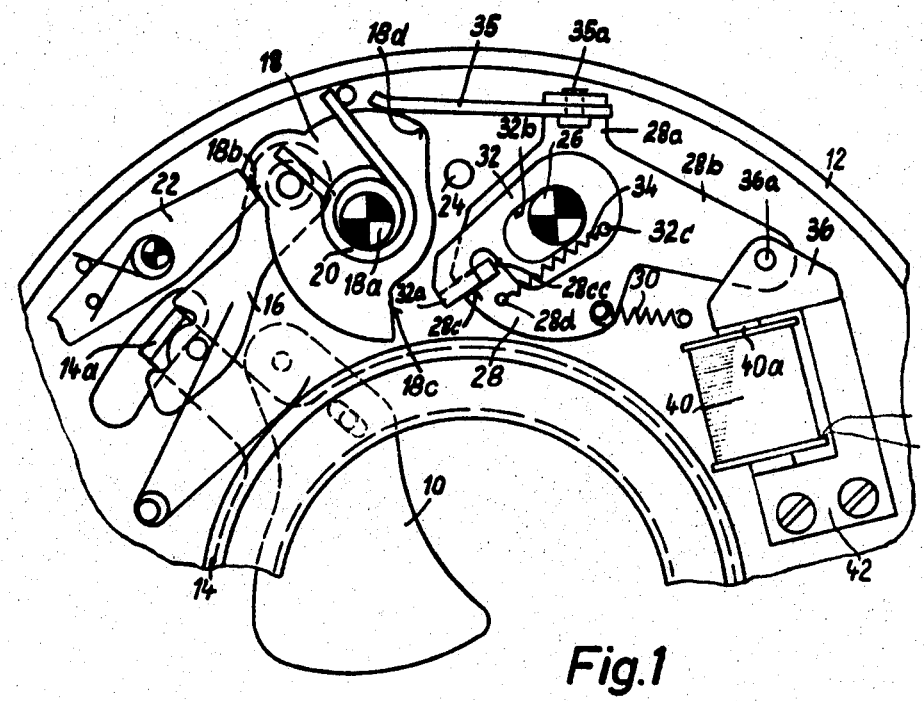
FIG. 1 is a view of the pertinent parts of a camera shutter in cocked condition and comprising a preferred, specific embodiment of a delay mechanism of this invention.

In greater detail, the two views of the drawing illustrate a photographic shutter, the structure of which, except for the delay mechanism, is well known. The shutter construction comprises the usual shutter blades 10, only one of which has been illustrated, mounted in a shutter housing 12 and pivoted into and out of their aperture closing positions and aperture opening defining positions by a rotatable blade driving ring 14 with an arm 14a in engagement with a link 16 pivotally connected to a rotatable main driving member or master member 18.

The master member 18 is secured to the usual rotatable tensioning shaft 18a which projects out of the shutter housing 12 to the film feed mechanism (not shown) with which it is conventionally and preferably in combination and which turns it in the rotational direction (clockwise in FIG. 1) for cocking the master member 18. Coiled about the shaft 18a with one end secured to a pin on the master member and with the other end secured to a pin member of the shutter housing 12 is a main spring 20. The master member has the usual lock nose 18b which, when the master member is in cocked position, bears against the usual pivotally mounted locking lever 22 in combination with a shutter trip mechanism (not shown). The run down or rest position of the master member 18 is determined by a stationary stop pin member 24 of the shutter housing 12 in the path of travel of the usual stop nose 18c on the master member 18.

Figure 2:
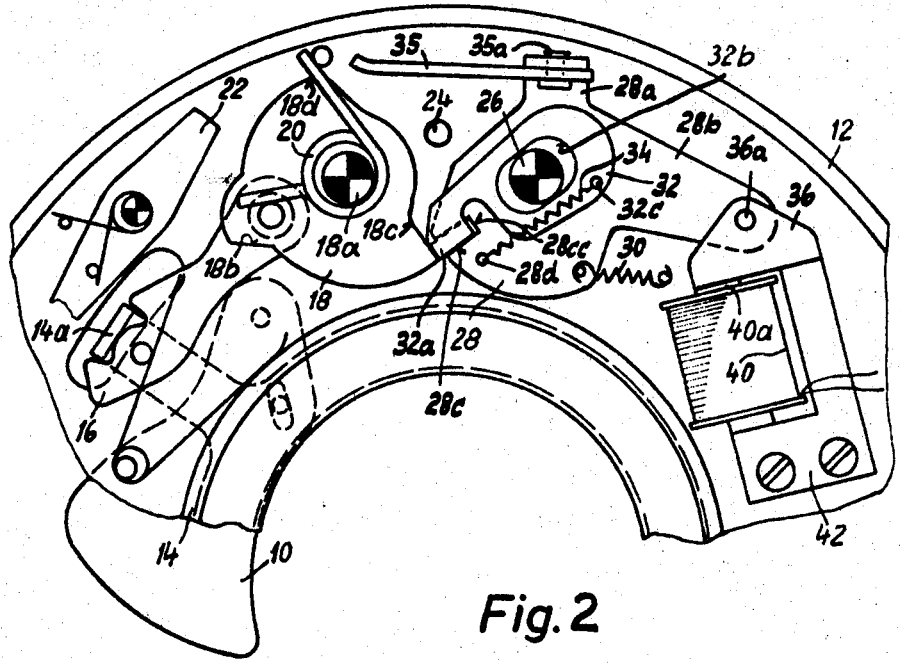
FIG. 2 is a view of the same parts of the shutter of FIG. 1, but showing the parts with the master member in a partially run down condition and in motion arrested contact with the delay mechanism.

The delay mechanism of this invention comprises a delay lever 28 rotatably mounted on a stationary pin member 26 of the shutter housing and providing an axis of rotation for the delay lever substantially parallel to the optical axis or axis of the aperture. The delay lever 28 has two pivot positions, a master member block or arrest position (see FIGS. 1 and 2), and a master member unblock position (not shown). A return spring 30 with one end secured to a pin member of the delay lever 28 and with the other end secured to an anchor pin member of the shutter housing 12 is provided for biasing the delay lever 28 toward the unblock position, in the counterclockwise direction in the embodiment shown. The delay lever 28 comprises a first arm 28a with a flange, a second arm 28b and a third arm with an elongated, lug guide slot 28c. In combination with the third arm is a movable impact element 32 having a substantially flat slide portion with an elongated, pin slide slot 32b in which is slidably disposed the stationary pin member 26 on which the delay lever 28 is rotatably mounted. The impact element 32 also has a lug 32a transversely to the plane of the substantially flat slide portion and slidably disposed in the lug guide slot 28c. In the embodiment shown, the longitudinal axis of the lug guide slot 28c is at least parallel, and preferably substantially alined with the longitudinal axis of the pin slide slot 32b, and both axes are substantially in the direction of impact of the master member 18 and delay lever 28. In the embodiment shown, the lug 32a extends outwardly beyond the outer end of the third arm of the delay lever 28 and presents an impact or arresting surface to the master member 18, particularly the stop nose 18c of the master member. The inner end 28c of the guide slot in the delay lever 28 provides a limiting surface or abutment for the inner end of the lug 32a under normal operative conditions. In addition, there is a damping spring 34 anchored at one end to an anchor pin member 28d of the delay lever 28 and at the other end to an anchor pin member 32c on the impact element 32. The damping spring 34 and anchor pin members 28d and 32c are arranged so that normally the impact element 32 is constantly urged radially outwardly from the stationary pin member 26. Consequently, when the delay lever 28 is in unblock position, the impact element 32 is positioned with the stationary pin member 26 at the inner end of the elongated pin slide slot 32b and the outer end of the lug 32a in its outermost position. Preferably the strength of the damping spring 34 is such that when the delay lever 28 has arrested the travel of the master member 18 (see FIG. 2), the impact element 32 is positioned between and desirably about midway its two extreme positions.

Secured as by a rivet 35a to the flange of the first arm 28a of the delay lever 28 is a cam follower bar 35 which preferably is in the form of a leaf spring. It is disposed in the path of travel of, and it cooperates with, a peripheral crown cam surface 18d on the master member 18.

Pivotally mounted on a pivot pin 36a at the outer end of the second arm 28d of the delay lever 28 is a magnetically attracted armature 36. Associated with this armature is an electromagnet comprising a magnetizable core 40a and a winding or coil 40 connected to an electrical circuit (not shown) for controlling the exposure period. The electromagnet is mounted on an insulator plate 42 secured to the shutter housing 12. Preferably, the delay lever 28, except for the armature 36, is electrically non-conductive.

The shutter construction illustrated in the drawing operates as follows.

Starting with the master member 18 in rest position, that is, with the stop nose 18c against the stop pin member 24 of the shutter housing, the cocking shaft 18a is turned in the tensioning or cocking direction (clockwise in FIG. 1) until the locking lever 22 drops behind the locking nose 18b of the master member and thereby holds the master member 18 in the cocked or tensioned position. Preferably this rotation of the cocking shaft 18a is accomplished by actuation of the film feed mechanism of the camera. By rotating the cocking shaft 18a and thus the master member 18 from its rest to its cocked or tensioned position, the main spring 20 is tensioned. Toward the end of the cocking movement of the master member 18, the follower bar 35 is pushed by the crown cam surface 18d radially outwardly relative to the center of the master member. This pivots (clockwise in FIG. 1) the delay lever 28 against the action of the return spring 30 into its master member block position. This causes the armature 36 on the outer end of the second arm 28b of the delay lever to move toward the electromagnet core 40a. At this stage, however, the electromagnet is not energized.

When the shutter trip mechanism is actuated, the locking lever 22 is pivoted and a switch is closed in the exposure period control electrical circuit. Pivoting of the locking lever 22, in the counterclockwise direction in FIG. 1, disengages the locking nose 18b of the master member from the locking lever and the master member is thereby released and commences to run down. Closing of the switch in the electrical circuit causes the electromagnet to be energized and hold the armature 36 and thus the delay lever 28 in the master member block position.

As the master member rotates or runs down from its cocked or tensioned position, its motion is transmitted by way of the link 16 to the arm 14a of the blade drive ring 14, causing the ring 14 to turn and move the shutter blades 10 from their closed aperture positions to their positions which define a maximum aperture opening.

Also, as the master member turns from its cocked position, the crown cam surface 18d moves away from the cam follower bar 35, but the delay lever 28 remains in the master member block position because of the armature 36 and the energized electromagnet.

When the delay lever 28 is in the master member block position, the outer end of the lug 32a of the impact element is in the path of travel of the stop nose 18c of the master member, and at a position so as to be struck by the stop nose 18c when the shutter blades 10 are substantially at their selected maximum aperture opening defining positions. When the stop nose 18c strikes the outer end of the lug 32a, the spinning or running down movement of the master member is stopped. The resilient, energy absorbing arrangement comprising the impact element 32 and the damping spring 34 causes rebounding of the stop nose 18c from the outer end of the lug 32a to be rapidly damped. Moreover, because of the positive coupling of the delay lever third arm and impact element 32, this damped impact of the stop nose 18c against the outer end of the lug 32a is effectively directed to the stationary pin member 26 of the shutter housing 12, whereby the electromagnet and associated mechanical parts are to a large extent protected from the impact.

After the preselected exposure time or period has elapsed, the electrical circuit for controlling the exposure period disrupts the electrical current flow through the electromagnet coil 40, thereby de-energizing the electromagnet and freeing the armature 36. Thereupon, because of the tensioned return spring 30, the delay lever 28 and thus the impact element 32 are rotated, in the counterclockwise direction in FIG. 2, out of the master member block position to the master member unblock position, whereby the outer end of the lug 32a is removed from the path of travel of the stop nose 18c.

The master member 18 is thereby free to continue its running down movement and it does so until its stop nose 18c encounters the rest stop member 24. In so doing, its motion is transmitted through the link 16 and arm 14a to the blade driving ring 14 which rotates and causes the shutter blades 10 to pivot into their closed aperture positions.

Thus there is provided a camera shutter construction with a delay mechanism which has a highly effective motion damping structure. An advantage of the motion damping structure of this invention is that it is not only effective in shutter constructions involving small dynamic forces, but also in the case of shutter constructions involving extremely powerful drives, such as are employed in shutters with large apertures. Other advantages of the motion damping structure of this invention include ruggedness and compactness.

It is seen from the foregoing disclosure that the purposes of the invention are well fulfilled. It is to be understood that the disclosure is given by way of illustrative example only, rather than by way of limitation, and that without departing from the invention, the details may be varied within the scope of the appended claims.

What is claimed is:

1. In a shutter construction having a master member for effecting the opening and closing of an aperture, and comprising a delay mechanism for stopping said master member in its running down movement at substantially the stage in its travel when the opening of said aperture is at a maximum, the improvement wherein said delay mechanism comprises impact means for contacting said master member and for receiving the impact thereof when said delay mechanism is actuated into stopping said master member, said impact means being displaceable by said master member substantially in the direction of said impact; and elastic means in combination with said impact means for resisting displacement of said impact means in said direction and for absorbing impact forces.

2. A shutter construction according to claim 1, wherein said delay mechanism comprises a delay lever pivotally mounted on a pivot pin with said impact means being positively coupled to said lever for movement therewith into and out of a master member stopping position.

3. A shutter construction according to claim 2, wherein said delay lever has an arm with an elongated guide slot, and said impact means comprise an impact element having a slide portion slidably disposed on said arm and further having a transverse portion slidably disposed in said guide slot.

4. A shutter construction according to claim 3, wherein said slide portion has an elongated pin slot in which is slidably disposed said pivot pin, the center line of said pin slot and the center line of said guide slot being substantially in the same direction.

5. A shutter construction according to claim 4, wherein said direction is substantially the direction of impact.

6. A shutter construction according to claim 5, wherein said center lines are substantially in alinement.

7. A shutter construction according to claim 6, wherein said delay lever has a second arm, in the region of the outer end of which is pivotally mounted a magnetically attracted armature, and said construction comprises an electromagnet in combination with said armature with the winding of said electromagnet being connected to electrical means for controlling the exposure period of said shutter construction.

8. A shutter construction according to claim 7, wherein said delay lever has a third arm with a cam follower, and said master member is rotatable, has a stop nose and has a peripheral cam surface which at the end of cocking movement of said master member is in sufficient contact with said follower to cause said follower to pivot said delay lever to move (a) said impact means into the path of travel of said stop nose and (b) said armature into position for magnetic holding by said electromagnet when said shutter construction is tripped.

References Cited
UNITED STATES PATENTS

| | | | |
|---|---|---|---|
| 1,274,262 | 7/1918 | Gross | 95—63 |
| 3,014,418 | 12/1961 | Hahn | 95—63 |

NORTON ANSHER, *Primary Examiner.*

DAVID B. WEBSTER, *Assistant Examiner.*

U.S. Cl. X.R.

95—62, 63